Nov. 16, 1943.    F. A. REECE    2,334,287
PILOTAGE WATCH
Filed June 19, 1942    5 Sheets-Sheet 1
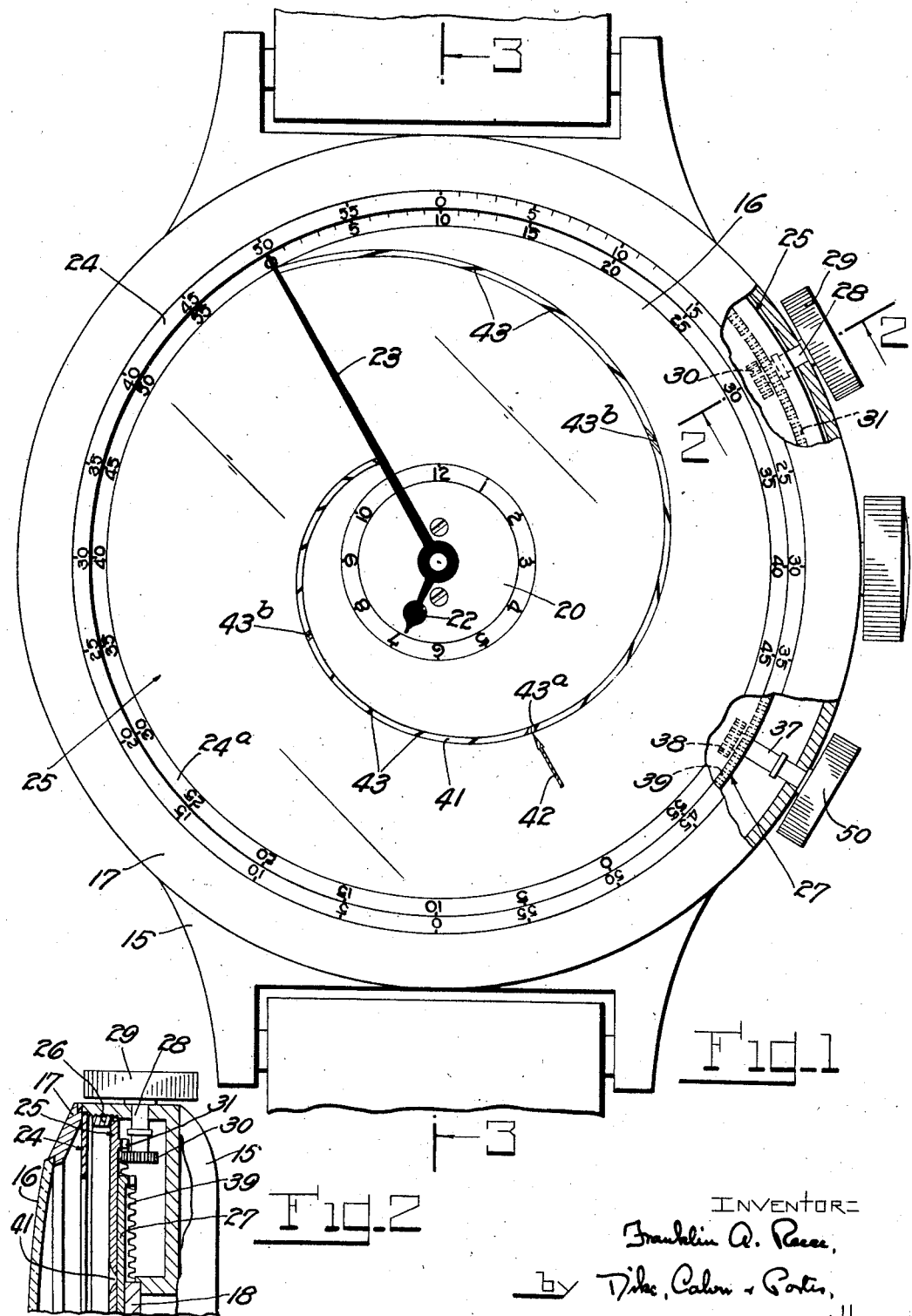
INVENTOR:
Franklin A. Reece,
by Dike, Calver & Porter,
Attys.

Nov. 16, 1943.  F. A. REECE  2,334,287
FILOTAGE WATCH
Filed June 19, 1942  5 Sheets-Sheet 2

INVENTOR:
Franklin A. Reece,
by Pike, Calver & Porter,
Attys.

Nov. 16, 1943.  F. A. REECE  2,334,287
PILOTAGE WATCH
Filed June 19, 1942  5 Sheets-Sheet 3

INVENTOR:
Franklin A. Reece
by Dike, Calver, Porter
Attys.

Nov. 16, 1943.  F. A. REECE  2,334,287
PILOTAGE WATCH
Filed June 19, 1942  5 Sheets-Sheet 4

INVENTOR:
Franklin A. Reece.
by Dike, Calver, Porter
Attys.

Patented Nov. 16, 1943

2,334,287

UNITED STATES PATENT OFFICE 2,334,287

PILOTAGE WATCH

Franklin A. Reece, Brookline, Mass.

Application June 19, 1942, Serial No. 447,619

13 Claims. (Cl. 235—61)

This invention relates to scales the spacing of whose graduations are infinitely and uniformly variable throughout the length of the scale in accordance with variable requirements, and to indicating or registering instruments employing such a scale in connection with a hand or equivalent indicator movable thereover at a predetermined rate. It has for its general object to provide a scale capable of such variation by a simple adjustment, which scale is of mechanically simple construction and capable of economical quantity production.

The invention is particularly, although not exclusively, applicable to, and is herein illustrated in connection with, a pilotage watch of the general type described in the Putnam Patent No. 2,289,038, July 7, 1942. The watch constituting the subject of said patent was adapted to indicate directly, at any instant, and without computation, the distance traversed from a given point of departure at a given or assumed ground speed and, by setting in accordance with observations made upon check points of known position, to register directly, immediately and automatically the actual ground speed, all without the necessity of the velocity-time-distance computations theretofore necessary for these purposes. Said watch comprises a scale graduated in distances and a hand movable thereover at a speed proportional to elapsed time, the spacing of the graduations of the scale and the speed of travel of the hand being relatively adjustable to cause the hand to indicate on the scale uniform and uniformly variable distances per units of time. The present invention has for one of its more particular objects to provide a timepiece having all of the capabilities of that of the aforesaid patent but of a mechanically simplified construction better adapted to quantity production.

The invention will best be understood from the following description of a preferred embodiment thereof shown in the accompanying drawings and chosen for purposes of exemplification, it being contemplated, however, that the invention, as defined by the claims hereunto appended, may be otherwise embodied without departure from its spirit and scope.

In said drawings:

Fig. 1 is an enlarged face view, partly broken away, of a wrist watch embodying the invention;

Fig. 2 is a fragmentary section taken substantially on the line 2—2, Fig. 1.

Figs. 7 and 8 are illustrative diagrams to be referred to.

Figure 7:
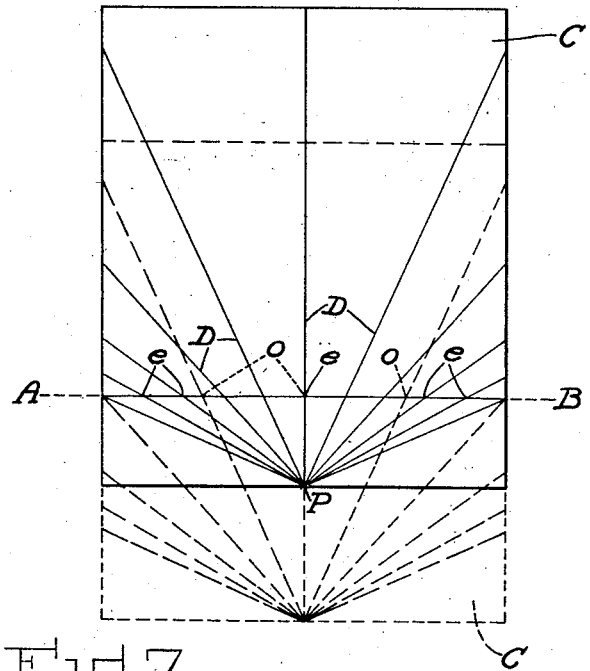

Th principle and mode of operation of the invention are diagrammatically illustrated in Fig. 7. In this figure, AB represents a reference line defined or formed in any suitable manner, as by being drawn on a transparent face plate or by a narrow slot in an opaque plate. C represents a plate or slide movable or adjustable relative to the line AB and having thereon converging lines D which intersect the line AB at uniformly spaced points. The form and arrangement of the lines D with respect to the line AB and the direction of relative movement are such that the spacing of the points of intersection vary with the position of the plate C. In the diagram, the line AB being straight, and a rectilinear movement of the member C in a direction perpendicular to said line being contemplated, the lines D are likewise straight and converge to a point P. The line AB (or a portion thereof between the lateral edges of the plate C) may be considered a scale the graduations of which comprise the points of intersection therewith of the lines D. By moving or adjusting the plate C, the spacing of these graduations or points of intersection are uniformly varied. For example, when the plate or member C is in the position shown in full lines, the graduations or points of intersection e divide the scale or line AB into ten equal parts or spaces, and when the member C is in the position shown in dotted lines, the points of intersection o divide the line AB into four equal parts. In other words, the spacing of the graduations o is two and one half times that of the graduations e. If the scale or reference line AB be defined by or comprise a slot in an opaque plate overlying the plate or member C, the graduations (e, o, etc.) will comprise the portions of the lines D intercepted by and appearing through the slot.

It will be apparent that if the graduations e, o, were considered to represent distances, and if a hand or equivalent indicator were to be caused to move over the line AB lengthwise thereof at a speed proportional to elapsed time, said hand would indicate on the scale AB uniform distances per units of time uniformly variable in accordance with the adjusted positions of the member C.

Figure 3:
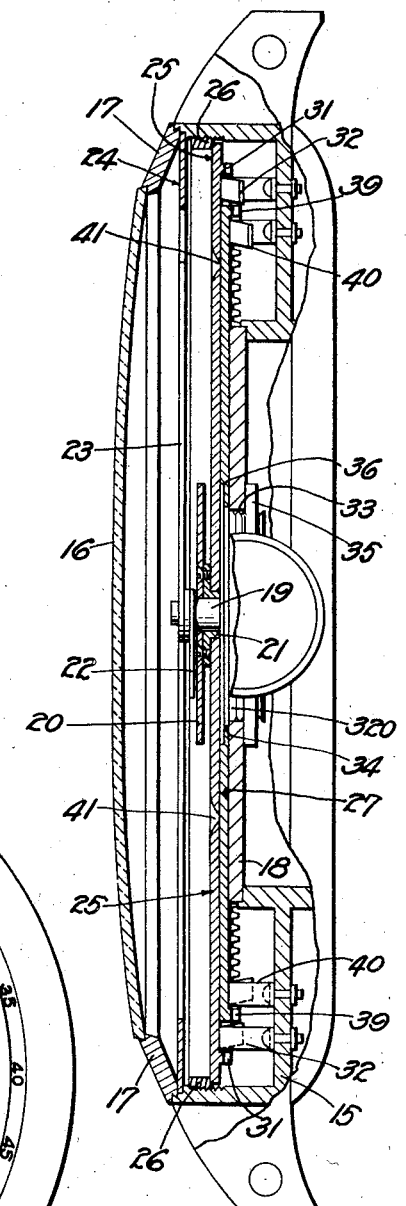
Fig. 3 is a section taken substantially on the line 3—3, Fig. 1.

Referring to Figs. 1 to 3, the invention is therein shown as applied to a wrist watch, although equally applicable to other timepieces, such as instrument board clocks, and to certain other instruments.

In the construction shown, the watch case 15 has the usual open front face normally closed by a crystal 16 carried by a bezel 17. Supported within the case 15 is a base plate 18 beneath which is located the usual clockwork mechanism (not shown). Extending through the base plate 18 is a hollow post 19 carrying a watch dial 20 which is secured to a flanged bushing 21 fast on said post. The dial 20 has the usual hour graduations around its periphery to cooperate with the usual hour hand 22. Also movable over the dial 20 is a minute hand 23, the nested arbors of said hour and minute hands being concentrically arranged within the hollow post 19 and being connected with the timing mechanism in the usual manner.

In the present construction, the minute hand 23 is elongated to cooperate with a separate time or minute scale 24 comprising a graduated ring secured within the outer edge of the case 15, as by the bezel 17. The timing gear (not shown) for the hand 23 is such as to cause it to move at a speed corresponding to the graduations of the scale 24. In the present instance, the scale 24 is so graduated as to include in its circumference two hours, sub-divided into minutes, and the timing of the hand 23 is such as to cause it to make a complete circuit of the scale 24, i. e., to move through 360°, in two hours. If preferred there may be provided, in addition to the special minute hand 23, an ordinary minute hand cooperating with the usual minute graduations on the dial 20, but for the purposes of the present invention this is not necessary, the minute indications of the hand 23 on the scale or dial 24 being sufficient.

Rotatably mounted on the post 19, or, more specifically, on the bushing 21, is an auxiliary dial 25. The dial 20 is relatively small, while the auxiliary dial 25 is substantially co-extensive with the open front of the watch case, so that a considerable area thereof is exposed beyond the edge of the dial 20. The dial 25 is axially located, on the one hand between the flange of the bushing 21 and a ring 26 threaded within the open face of the watch case, and on the other by a disk 27 (hereinafter described) interposed between said dial and the base plate 18.

The auxiliary dial 25 has about its periphery, immediately within the dial scale 24, graduations corresponding to the graduations of the scale 24 and constituting a second scale 24a. The dial 25 is rotatable to bring a zero point on the scale 24a into register with the hand 23 in any position of the latter. For this purpose there may be provided a setting stem 28 journalled in the wall of the watch case and provided at its outer end with a finger wheel or knob 29 and at its inner end with a pinion 30 cooperating with a circular rack 31 formed on the dial 25. If desired, the stem 28 may be longitudinally movable to carry the pinion 30 into and out of engagement with the rack 31, and friction springs 32 secured to the case 15 may be provided for frictionally holding the dial in set position.

The disk 27 is also rotatable about the fixed axis of the post 19. As shown, the mounting of the disk 27 comprises a bushing 32a received in an opening 33 in the base plate 18, said bushing being fitted within an opening 34 in the disk 27, having a threaded inner end to receive a nut 35, and having at its outer end a circular flange 36 received in a circular countersunk area surrounding the opening 34. The disk 27 may be angularly set by means of a setting stem 37 similar to the setting stem 28 and having a knob 50 and a pinion 38 cooperating with a circular rack 39 formed on the disk, and may be frictionally held in set position by friction springs 40 similar to the friction springs 32.

The dial 25 is pressed against the ring 26 by the springs 32, and the disk 27 is pressed against the flange 36 by the springs 40, and a suitable working clearance between the dial and disk may be provided for by adjustment of the ring 26.

Figure 4:
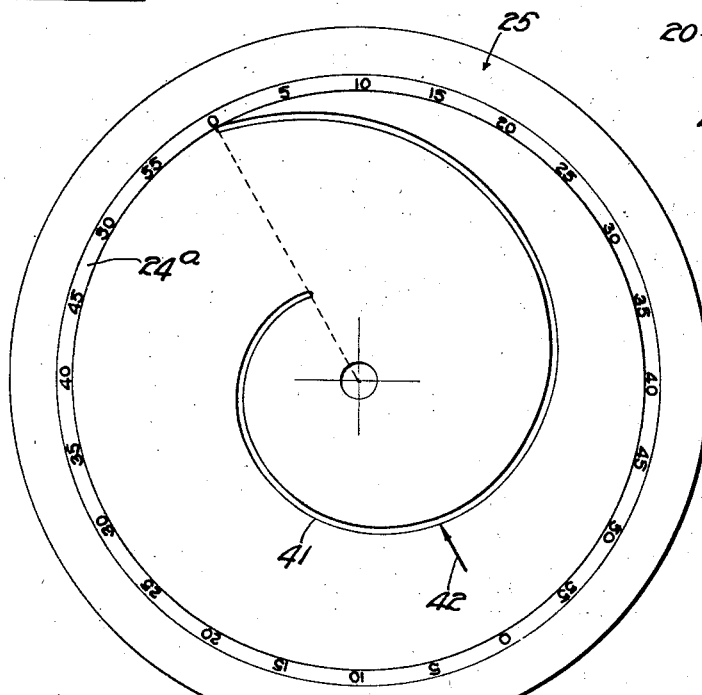
Fig. 4 is a separate view of the slotted auxiliary dial or face plate.

The portion of the dial 25 between the dial 20 and the scale 24a has formed therethrough a curved slot 41 extending thereabout. As shown, said slot is in the form of a counterclockwise spiral (i. e., a spiral which expands in a counterclockwise direction) 360° in length, and has its inner and outer ends substantially radially opposite one of the zero points of the scale of the dial 25 (see particularly Fig. 4). Opposite the other zero point (i. e., the point corresponding to a one hour movement of the hand 23) the dial 25 is provided with an index mark 42. The arrangement of the slot 41 with respect to the direction of angular movement of the hand 23 is such that said hand moves over the slot lengthwise thereof in a direction from its outer to its inner end. The slot 41 defines or constitutes a reference line corresponding functionally to the line AB of Fig. 7.

The disk 27 corresponds functionally to the slide C of Fig. 7 and has formed thereon curved lines 43 of generally spiral form corresponding functionally to the lines D of Fig. 7 and having portions which intersect and are visible through the slot 41 at variable spacing depending upon the angular position of the disk with respect to the dial 25. For convenience in reading, certain of the lines 43 may be distinctively colored. As shown, every tenth line 43a, or that portion thereof corresponding, for example, to 100 mile intervals, is colored red, the intermediate fifth lines 43b, corresponding, for example, to 50 mile intervals, being colored green. The lines can be conveniently engraved or etched upon the disk 27 and filled with a suitable pigment.

Figure 6:
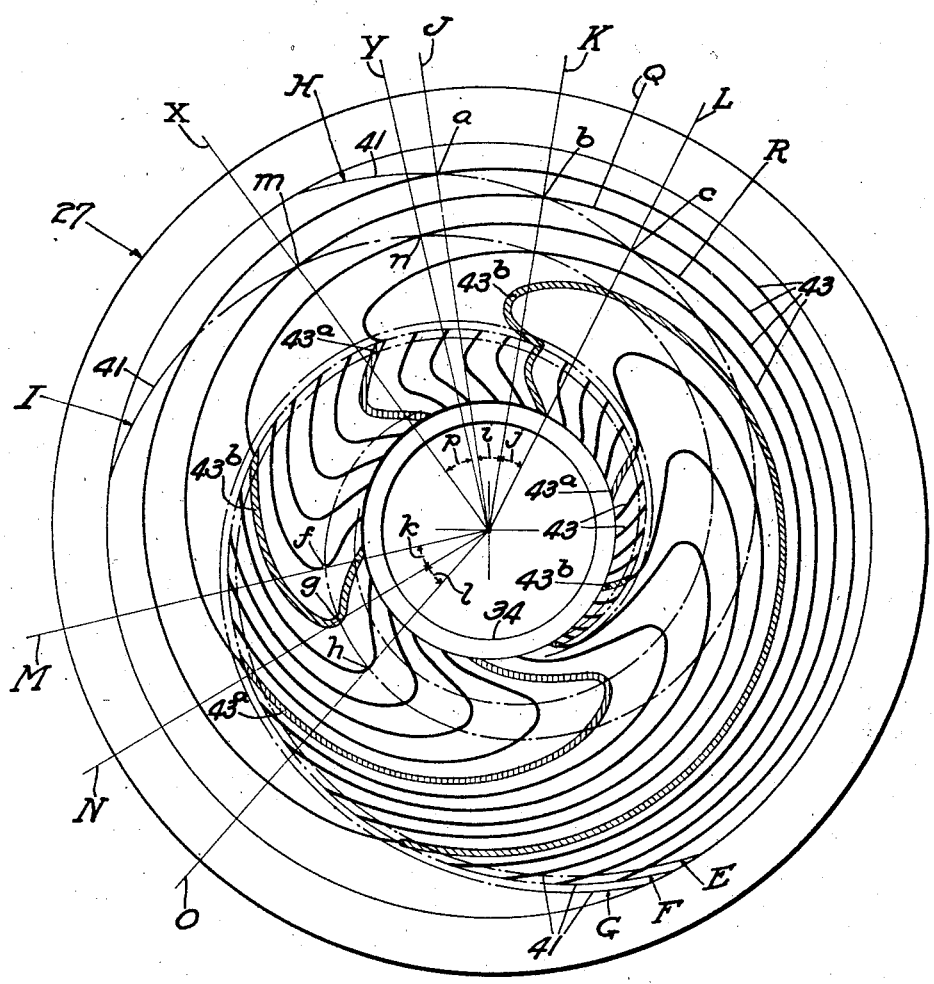
Fig. 6 is a separate view of the lined disk which cooperates with the slot in the face plate to constitute a scale having variably spaced graduations.

In Fig. 6 the form and arrangement of the lines 43 on the disk 27 is shown in detail, the width of the distinctly colored lines 43a and 43b being somewhat exaggerated with respect to that of the remaining lines 43. By employing lines 43 of the generally spirally curved form shown, in connection with a spiral dial slot 41 (and of opposite curvature: the spirals 43 being clockwise, and the spiral 41 being counterclockwise, as above stated), it is possible to arrange the dial 25 and disk 27 coaxially and to vary the spacing of the points of intersection of said lines and slot by relative rotation of said disk and dial about the common axis. In Fig. 6 there are also indicated in broken lines several positions E, F, G, H, I, of the dial slot 41 with respect to the lines 43. Although in this figure there is, for convenience, shown only one position of the disk 27 with its lines 43, and several positions of the dial slot 41, it will be understood that, in setting the instrument to vary the spacing of the graduations, it is the disk which is turned with respect to the dial.

Because of the spiral form of the slot 41, and its consequent varying distance from the center at different points along the length, its points of intersection with successive lines 43 are not uniformly spaced lengthwise or linearly thereof but are uniformly spaced angularly. By reference to the radial lines J, K, L drawn through points $a$, $b$, $c$ of intersection of successive lines 43 with the line H near the outer end of the latter, and to the radial lines M, N, O drawn through points $f$, $g$, $h$ of intersection of successive lines 43 with the line H near the inner end thereof, it will be seen that, while the points $f$, $g$, $h$ are more closely spaced than the points $a$, $b$, $c$, the angles $i$ and $j$ between the radii J, K, L and the angles $k$ and $l$ between the radii M, N, O are all equal to one another. Consequently, the hand 23, in its angular movement lengthwise of the slot 41, is caused to pass over graduation spaces of equal value per units of time in all angular positions.

The liens 43, in their relation to the line or slot 41, converge outwardly radially of the disk 27; that is to say, the spacing of the points of intersection of successive lines 43 with the line 41 decreases as the distance from the center increases. For example, the points $b$, $c$ of intersection of successive lines Q, R with the line H are closer together than the points $m$, $n$ of intersection of the same lines Q, R with the line I, which latter points of intersection are nearer the center than the points $b$, $c$. The difference in spacing is angular as well as linear. It will be observed that the angle $p$ between the radial lines X, Y drawn through the points $m$, $n$ is greater than the angle $j$ between the radial lines K, L through the points $b$, $c$. These differences are more apparent near the outer edge of the disk where, due to the spiral form of the slot 41, as above explained, the spacing is more open than near the center where, for the same reason, it is closer. The line F represents a limiting relative position of the parts. As the disk 27 is turned in a clockwise direction from this position successively through the relative positions E, H, I, the spacing of the points of intersection progressively increases from a minimum. As the disk is turned in a counterclockwise direction from the position F through the positions G, I, H, the spacing progressively decreases from a maximum.

Figure 8:
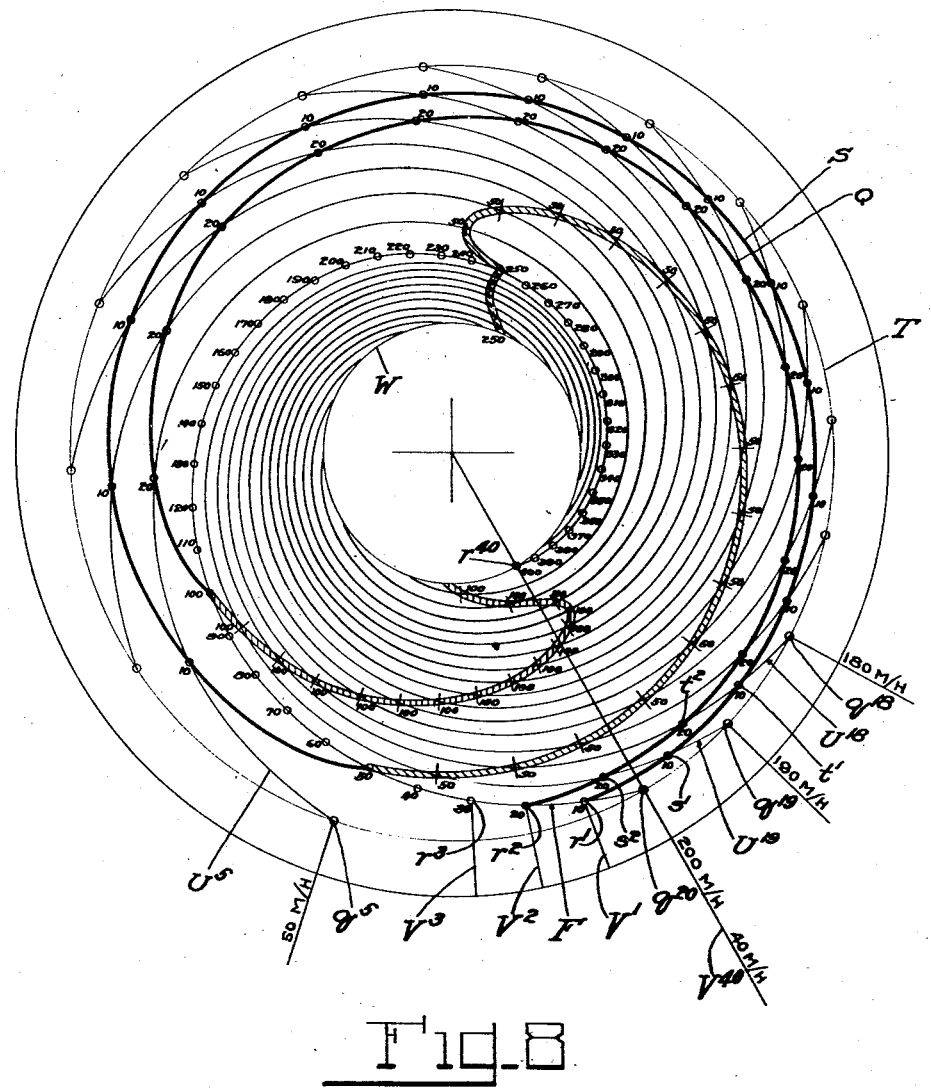

The lines 43 are empirically plotted with reference to the line or slot 41 to produce the results described and, having once been established, can, as a production proposition, readily be duplicated or reproduced on other disks by known methods. One method of so plotting or establishing the forms and positions of the lines 43 is illustrated in Fig. 8. In this figure, the plotting of only two lines is illustrated, namely, the line S, the outer portion of which lies nearest the outer edge of the disk, and the line Q (corresponding to the line Q of Fig. 6), the outer portion of which lies immediately within the outer portion of the line S, but it will be understood that a similar procedure may be followed in plotting the remaining lines.

As shown herein, the dial slot 41 is approximately in the form of a logarithmic spiral. As above stated, the hand 23 is, in the present instance, timed to make a complete circuit of 360° in two hours. The device shown is designed to indicate speeds through a range between 40 miles per hour and 200 miles per hour. On this basis, the procedure of plotting the lines 43 may be as follows.

An outer base circle T (which is the locus of the outer end of the slot 41) is divided into sixteen spaces logarithmically proportioned, or approximately so, the direction of progressive increase being counterclockwise in accordance with the direction of expansion of the spiral slot 41. The points of division $q^{20}$, $q^{19}$, $q^{18}$ ... $q^5$ may conveniently be designated 200 mi./hr., 190 mi./hr., etc., points, the 40 mi./hr. point coinciding with the 200 mi./hr. point. A spiral line F corresponding in shape to the slot 41 (and also corresponding to the limiting line F of Fig. 6) is drawn with its outer end coinciding with the point $q^{20}$, i. e., the 200 mi./hr.—40mi./hr. point. Similar spiral lines $U^{19}$, $U^{18}$ ... $U^5$ are drawn with their outer ends coinciding with the points $q^{19}$, $q^{18}$ ... $q^5$. These spiral lines may conveniently be drawn by means of a template having an edge corresponding in form to the slot 41 and which can be progressively turned into the successive angular positions. Forty equiangularly spaced radial lines $V^1$, $V^2$, $V^3$ ... $V^{40}$ are drawn to intersect the spiral line F at points $r^1$, $r^2$, $r^3$ ... $r^{40}$ which may conveniently be designated 10, 20, 30 ... 400 mile points, since, at 200 mi./hr., the hand 23 will, in making a complete circuit of 360° in two hours, indicate a distance covered of 400 miles. The spiral $U^{19}$ is intersected at points $s^1$, $s^2$ etc. (likewise constituting 10, 20, etc., mile points) by thirty eight equi-angularly spaced radial lines (since, at 190 mi./hr., the hand in a complete circuit will indicate a distance of 380 miles), the spiral $U^{18}$ is intersected at points $t^1$, $t^2$, etc., by thirty six equiangularly spaced radial lines, and so on through the series. The line S, beginning with the point $r^1$, and proceeding in a counterclockwise direction, is drawn through the points $s^1$, $t^1$, etc., i. e., the 10 mile points of the successive spirals, until the last spiral has been crossed, thence to the 50 mile point of the spiral F, thence through the 50 mile points of the successive spirals until the last has again been crossed, thence to the 250 mile point of the spiral F, and finally through the 250 mile points of successive spirals or as many of them as are crossed before reaching its inner end at the circle W, which is the locus of the inner end of the slot 41. Similarly, the line Q, beginning with the point $r^2$, is drawn through the points $s^2$, $t^2$, etc., or 20 mile points of the successive spirals until the last has been crossed, thence to the 100 mile point of the spiral F, and finally through the 100 mile points of the successive spirals to the circle W, this line not crossing the spiral F a second time. The same general procedure is followed in plotting the other lines 43, as will be obvious by reference to Figs. 6 and 8 in connection with the foregoing description. It will be observed that, as and if crossing the line F (thereby, so to speak, passing from a 40 mi./hr. zone to a 200 mi./hr. zone), each line is thereafter passed through mile points of five times the value of those previously traversed, a 200 mi./hr. shpeed being five times as great as a 40 mi/hr. speed.

Figure 5:
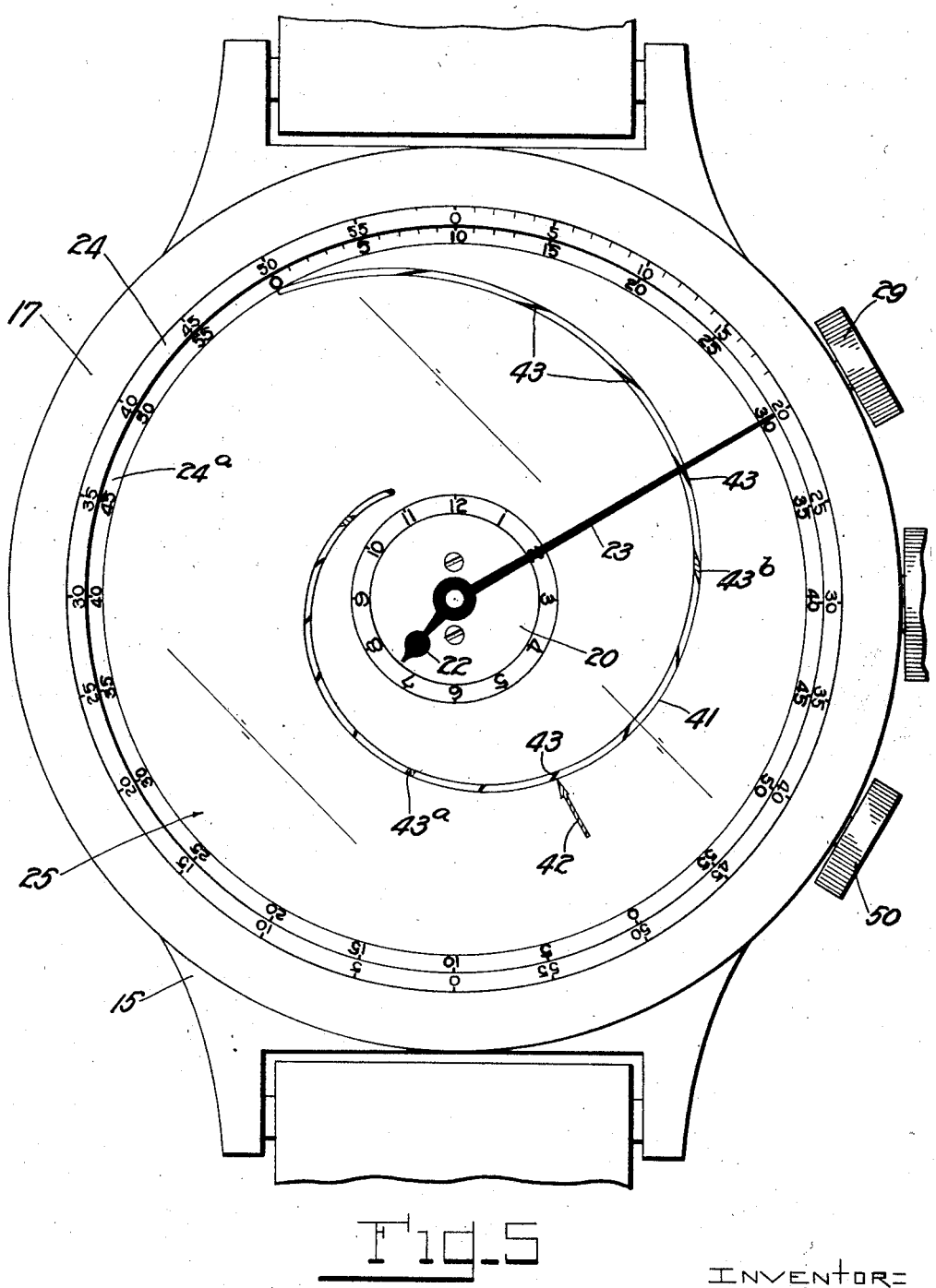
Fig. 5 is a view similar to Fig. 1 showing a different adjustment.

The use of the above described timepiece is similar to that described in the aforesaid Putnam patent and is as follows. At the time of departure, the dial 25 is angularly set by the stem 28 to bring the zero point thereon which is opposite the outer end of the slot 41 into register with the hand 23 at that time, as shown in Fig. 1. The ground speed in miles per hour having been estimated, the disk 27 is turned by the setting stem 37 to cause a graduation (comprising a slot-intercepted portion of one of the lines 43) corresponding to that speed to register with the index mark 42. As shown in Fig. 1 (and at H in Fig. 6), the disk is set (that is to say, the scale comprising the slot 41 and intercepted portions of the lines 43 adjusted), for a ground speed of 100 miles per hour. Thereafter the hand 23, moving in a clockwise direction over the dial 25 and distance scale 41, 43, will, at any moment (indicated on the dial 25), indicate on said scale the distance traversed from the point of departure at that moment, assuming the correctness of the initially estimated ground speed for which the disk 27 has been set. This ground speed can, however, be checked and verified, or the setting of the instrument corrected in this respect, at an early period in the flight by observing a recognizable landmark whose distance in miles from the point of departure is known or can be scaled on the map. Thus, as shown in Fig. 5 (and at I in Fig. 6), after flying for 30 minutes the pilot finds himself over a landmark known to be 40 miles from the point of departure. The disk 27 is thereupon re-set to bring the graduation 43 corresponding to 40 miles opposite the hand 23, whereupon the actual ground speed will be indicated by the graduation 43 opposite the index mark 42. As shown in Fig. 5, the graduation 43 corresponding to 80 miles is opposite the index mark 42, showing that the actual ground speed is 80 miles per hour.

I claim:

1. A timepiece comprising means defining an elongated reference line, a hand movable over said line lengthwise thereof, and a disk having radially converging lines intersecting said reference line, said reference line constituting a scale the graduations of which comprise the points of intersection therewith of said converging lines, said disk being rotatable to vary the spacing of said graduations or points of intersection.

2. A timepiece comprising means defining a curved reference line and a hand angularly movable over said line lengthwise thereof, said line constituting a scale whose graduations comprise the points of intersection therewith of converging curved lines on a member adjustable relative to said reference line to vary the spacing of said graduations or points of intersection.

3. A timepiece comprising means defining a curved reference line and a hand angularly movable over said line lengthwise thereof, said line constituting a scale whose graduations comprise the points of intersection therewith of radially converging curved lines on a member which is movable with respect to said reference line to vary the spacing of said graduations or points of intersection.

4. A timepiece comprising means defining a curved reference line and a hand angularly movable over said line lengthwise thereof, said line constituting a scale whose graduations comprise the points of intersection therewith of radially converging curved lines carried by a member which is rotatable to vary the spacing of said graduations or points of intersection.

5. A timepiece comprising means defining a curved reference line and a hand angularly movable over said line lengthwise thereof, said line constituting a scale whose graduations comprise the points of intersection therewith of radially converging curved lines on a member which is rotatable about a fixed pivot to vary the spacing of said graduations or points of intersection.

6. A timepiece comprising a dial having a curved slot extending thereabout and a hand angularly movable over said dial, said slot constituting a scale whose graduations comprise the portions intercepted by said slot of radially converging curved lines on a disk which is disposed beneath said dial and rotatable with respect thereto to vary the spacing of the graduations or portions of said lines appearing through said slot.

7. A timepiece comprising a dial having a curved slot extending thereabout and a hand angularly movable over said dial, said slot constituting a scale whose graduations comprise the portions intercepted by said slot of radially converging curved lines on a disk which is disposed beneath said dial and rotatable with respect thereto upon a fixed axis to vary the spacing of the graduations or portions of said lines appearing through said slot.

8. A scale the spacing of whose graduations is infinitely and uniformly variable throughout its length, said scale comprising means defining a reference line and a disk having radially converging lines intersecting said reference line, the graduations of said scale comprising the points of intersection of said converging lines with said reference line, and said disk being rotatable to vary the spacing of said graduations.

9. An indicating instrument comprising means defining a reference line, an indicator movable over said line lengthwise thereof, and a disk having radially converging lines intersecting said reference line, said reference line constituting a scale the graduations of which comprise the points of intersection therewith of said converging lines, said disk being rotatable to vary the spacing of said graduations.

10. An indicating instrument comprising means defining a curved reference line, a member having converging lines intersecting said reference line, said reference line constituting a curved scale the graduations of which comprise the points of intersection of said converging lines with said reference line, and a hand angularly movable over said scale, said member being adjustable with respect to said reference line to vary the spacing of said graduations, whereby a given angular movement of said hand will indicate on said scale variable values in accordance with the adjustment of said member.

11. An indicating instrument comprising means defining a curved reference line, an angularly adjustable member having radially converging curved lines intersecting said reference line, said reference line constituting a curved scale the graduations of which comprise the points of intersection of said converging lines with said reference line, and a hand angularly movable over said scale, angular adjustment of said member varying the spacing of said graduations, whereby a given angular movement of said hand will indicate on said scale variable values in accordance with the adjustment of said member.

12. An indicating instrument comprising means defining a curved reference line, a member angularly adjustable about an axis fixed with respect to said reference line, said member having radially converging lines intersecting said reference line, said reference line constituting a curved scale the graduations of which comprise the points of intersection of said converging lines with said reference line, and a hand angularly movable over said scale, angular adjustment of said member varying the spacing of said graduations, whereby a given angular move ment of said hand will indicate on said scale variable values in accordance with the adjustment of said member.

13. An indicating instrument comprising a dial having a curved slot extending thereabout, a disk disposed beneath said dial and rotatable with respect thereto, said disk having radially converging curved lines intercepted by said slot, said slot constituting a scale whose graduations comprise the portions of said lines intercepted by and appearing through said slot, and a hand angularly movable over said dial, rotation of said disk varying the spacing of said graduations, whereby a given angular movement of said hand will indicate on said scale variable values in accordance with the rotated position of said disk.

FRANKLIN A. REECE.